United States Patent [19]

SCM Corporation

[11] Patent Number: 4,567,047
[45] Date of Patent: Jan. 28, 1986

[54] CHEESE-CONTAINING CONFECTIONARY-LIKE COATING

[76] Inventor: SCM Corporation, 02, New York, N.Y.

[21] Appl. No.: 597,557

[22] Filed: Apr. 6, 1984

Related U.S. Application Data

[63] Continuation-in-part of Ser. No. 402,844, Jul. 29, 1982, abandoned.

[51] Int. Cl.$^4$ .................... A23G 3/00; A23C 19/09; A21D 15/08
[52] U.S. Cl. .................... 426/94; 426/99; 426/582; 426/607; 426/613; 426/302; 426/307; 426/660
[58] Field of Search .............. 426/613, 606, 607, 582, 426/589, 660, 302, 307

[56] References Cited

U.S. PATENT DOCUMENTS

| | | | |
|---|---|---|---|
| 2,015,257 | 9/1935 | Clickner | 426/583 |
| 2,015,258 | 9/1935 | Clickner | 426/583 |
| 2,168,360 | 8/1939 | Musher | 99/1 |
| 2,222,560 | 11/1940 | Clickner | 99/134 |
| 2,279,202 | 4/1942 | Musher | 426/583 |
| 2,289,576 | 7/1942 | Jordan | 426/583 |
| 2,586,615 | 2/1952 | Cross | 99/23 |
| 2,671,027 | 3/1954 | Cross | 426/613 |
| 2,999,023 | 9/1961 | Babayan | 99/118 |
| 3,431,112 | 3/1969 | Durst | 99/1 |
| 3,652,299 | 3/1972 | Penton | 99/144 |
| 3,814,825 | 6/1974 | Gilmartin et al. | 426/361 |
| 3,843,808 | 10/1974 | Ziccarelli | 426/583 |
| 3,857,977 | 12/1974 | Huessy | 426/189 |
| 3,966,993 | 6/1976 | Luck | 426/589 |
| 4,198,439 | 4/1980 | Hoover | 426/632 |
| 4,232,050 | 11/1980 | Rule | 426/582 |

FOREIGN PATENT DOCUMENTS 1297579 11/1972 United Kingdom .

OTHER PUBLICATIONS

Food Engineering, May, 1967, pp. 79-82, "Polyfunctional Quality Improvers . . . Polyglycerol Esters.

*Primary Examiner*—Jeanette M. Hunter
*Attorney, Agent, or Firm*—Richard H. Thomas

[57] ABSTRACT

A cheese flavored confectionery composition containing dry powdered cheese, a bland particulate fill, a hard butter, an emulsifier and stearine. The composition is refined and conched and suitable for application to various substrates.

13 Claims, No Drawings

CHEESE-CONTAINING CONFECTIONARY-LIKE COATING

This is a continuation-in-part of application Ser. No. 402,844, filed 7/29/82.

The present invention relates broadly to fat reconstituted cheese powder products, and more specifically to confection-like coatings which contain cheese powder, are ambient and heat stable, and which have an appearance and characteristics of natural hard cheese. By ambient stable, it is meant that the products or coatings, which contain a flavoring amount of cheese powder, can be stored for prolonged periods, under ambient conditions, without refrigeration and without spoiling or degradation of the cheese powder. By heat stable, it is meant that the products or coatings are resistant to finger printing, fat bloom and physical change under normal handling and/or shipping conditions.

An advantage of the present invention is that the coatings can be made using conventional confectionery equipment and knowledge. The coatings have outstanding flavor, appearance, and nutritional value, and can be applied to a variety of substrates.

BACKGROUND OF THE PRESENT INVENTION

Prior U.S. Pat. No. 2,222,560 to Clickner describes a cheese-flavored coating which comprises spray dried cheese powder and a fat such as refined coconut oil or hydrogenated coconut, cottonseed, sesame, or corn oil. The coating may comprise 15-20% cheese powder, and is said to be substantially solid at room temperature, having a consistency similar to butter but can be readily applied to popcorn or the like by melting and then pouring or spraying. The composition does not produce a hard coating having the smooth, firm texture of a hard cheese.

U.S. Pat. No. 3,431,112 to Durst, describes a food bar which contains a binder of a normally solid fat or oil encapsulated with a film-former such as non-fat milk solids, sodium caseinate, soy protein and others, referred to as hydrophilic colloids, and particulate. Cheese particles are listed as one of a number of alternative particulate foods. No example is given in the patent using cheese particles, or describing a product which resembles cheese. A typical product of the patent may contain about 15 parts non-fat milk solids, about 15 parts lard flakes, and about 19 parts sucrose, the particulate food being a blend of corn flakes and wheat flakes dispersed in the binder in a ratio of about 52% particles and 45% binder.

Hoover U.S. Pat. No. 4,198,439 describes a cheese product composed of a blend of ground roasted nuts, a texture modifying fat and dehydrated cheese (which may be spray dried cheese powder), the product having a water activity below about 0.7%. The product is said to be suitable as a spread for snacks and can be stored for extended periods without refrigeration. An emulsifier such as mono- and diglyceride or lecithin may be added to stabilize the product. The texture-modifying fat is a non-hydrogenated fat in combination with hydrogenated fat, glycerides and mixtures thereof, and has a Capillary Melting Point of more than 120° F. In preparing the product, the lipids, in an amount of about 5-15% of the final product, are first melted, and the nuts, in an amount of about 50-80%, and cheese powder in an amount of about 10-40%, are then added and blended into the lipids, in that order. No reference is made in the patent to the preparation of a product resembling hard cheese, or to confectionery properties of the product which is produced.

Prior U.S. Pat. No. 2,168,360 to Musher, describes a fat-containing food composition which can be added to water and cooked to make a product such as gravy. The food composition comprises essentially a hard fat and a water-absorbent bodying material such as cornstarch, tapioca, gum arabic, gelatin and pectin. Spices, condiments and the like, can be intimately admixed with these ingredients. The composition is intended for addition to water or an aqueous medium to make a final product, and would not be suitable as a confection-like coating.

U.S. Pat. No. 3,652,299 to Penton describes a concentrate product which is said to be a rigid or brittle solid at room temperature and which contains a fat, oil or hard butter, emulsifier, and starch material, such as potato starch, arrowroot starch, wheat starch or rice starch. The product of this patent also contains sauce flavoring materials desired to impart a characteristic flavor, such as milk solids, cheese, dehydrated onion chips, dehydrated mushrooms, pimiento, and others. Although principal applications for the concentrate product appear to be such foods as sauces, soups and gravies, prepared by addition to water, it is indicated in the patent that the concentrate of the patent, in a hot, viscous form, can be applied to a food item by spraying, for instance, onto dehydrated potato slices passing on a belt conveyer. On cooling, it is indicated that the concentrate forms a hard coating over the slices which then may be packaged in a suitable container. Even here, the intended ultimate application, such as escalloped or augratin potatoes, is intended to be cooked from a frozen state. There is no mention of forming a confection-like coating for consumption in the marketed state, and the concentrate product of this patent would not be suitable for the preparation of confection-like coatings.

U.S. Pat. No. 3,814,825 to Gilmartin et al describes a synthetic, chunked cheese-flavored product said to be suitable for use on salad dressings, dips, dehydrated foods and sauces. The product comprises finely comminuted cheese-flavored dry material admixed into a molten blend of hard and soft fats.

U.S. Pat. No. 3,857,977 to Huessy describes the formulation of edible food flavoring cubes or pellets for incorporation into dry food systems, wherein the cubes have a wheat flour, soy flour, and dry buttermilk base. Whey may also be present as a flavoring ingredient. The dry bulk ingredients are thoroughly mixed together and a fat phase, such as hydrogenated vegetable oil, is added. A water phase is then added and mixing is continued until homogeneous. The mix is extruded through a heated die and cut into pellets. The vegetable oil functions primarily to provide lubrication during the extrusion step.

Luck U.S. Pat. No. 3,966,993 assigned to assignee of the present application, describes a sauce or gravy bar adapted to be melted and mixed with water to produce a sauce or gravy for use. The sauce or gravy bars are prepared, in part, by mixing fat, flour and condiment solids together, tempering the mixture, forming the tempered mixture into a solid bar under conditions precluding complete remelting of the fat crystals, and cooling the bar to room temperature. Here again, the product would be unsuitable for the preparation of a confection-like coating.

In the confectionery art itself, it is known to add emulsifiers to coating formulations to form glossy surfaces which are bloom resistant. For instance, U.S. Pat. No. 2,586,615 teaches the value of sorbitan monostearate and polyoxyethylene sorbitan monostearate (polysorbate 60) as a bloom inhibitor. Prior U.S. Pat. No. 2,999,023 refers to the value of sugar esters for gloss enhancing. In the publication "Food Engineering", of May, 1967, pages 79-82, polyglycerol esters are mentioned as being useful for confectionery coatings and chocolate, to maintain gloss properties. They are also said to minimize tempering and handling problems, and to aid these products to retain moisture, thereby preventing them from drying out during storage. Specific polyglycerol esters mentioned were triglycerol monooleate and decaglycerol trishortening.

British Pat. No. 1,297,579 teaches the use of polyglycerol esters in chocolate compositions to obtain aeration of such compositions.

In copending application Ser. No. 592,176, filed Mar. 22, 1984, assigned to assignees of the present application (docket 20094), there is described a novel hard, confection-like coating having the flavor and texture of a hard cheese, but being capable of storage under ambient conditions, comprising; about 10-60%, preferably about 30-37%, of cheese powder; about 20-60% hard butter in sufficient amount, preferably about 35-40%, to form a continuous matrix, said hard butter having a Wiley Melting Point in the range of about 84°-120° F. and an approximate solid fat index of more than 40° at 80° F. and less than about 35° at 92° F.; about 0.4-0.8% lecithin; the remainder being essentially cheese related filler; said coating having a moisture content of less than about 3½%. In an embodiment, the hard butter may be blended with an amount of a hydrogenated vegetable oil to lower the lipid melting point and regulate texture and coating thickness. The coatings of said copending application can be applied to a variety of substrates such as corn chips, crackers, biscuits, meat centers such as Braunschweiger, textured vegetable proteins and the like. An advantage of the coatings of said copending application is that they can be prepared employing conventional confectionery techniques and apparatus and, when applied to a substrate, form a glossy hard coating similar to a confectionery coating, the texture and flavor, however, being that of a hard cheese.

The present invention constitutes an improvement in the coating formulations of said copending application. The disclosure of Ser. No. 592,176 is incorporated by reference herein.

SUMMARY OF THE PRESENT INVENTION

The present invention resides broadly in improved, fat-reconstituted cheese powder products and, more narrowly, in improved, hard, cheese-colored, confection-like coatings which, as with copending application Ser. No. have the flavor, appearance and texture of a hard cheese and which are capable of storage under ambient conditions, the products or coatings consisting essentially of on a weight basis; a flavoring amount of about 10-60%, preferably about 30-37%, of a dried cheese powder having a butterfat and/or vegetable fat content by weight of at least about 20%; a lipid phase comprising an added hard butter in sufficient amount of about 20-60%, preferably about 35-40%, to form a continuous matrix; and an effective amount of a crystal modifying emulsifier; the remainder being cheese related filler; the improvement wherein said product is heat stable.

The composition of the present invention, preferably, is lecithin free.

The cheese powders are preferably spray dried and may have a butterfat content of about 20-46%. They may also be dried in other ways, for instance by drum drying or pan drying.

For purposes of the present application, the term "coating" means a covering having discernable or visible thickness, as measured by the naked eye, as compared to a thin film. In order to have a cheese color or appearance, even a dull cheese color, the coating must have opacity, and the coatings of the present invention have sufficient thickness to be opaque and to provide such color or appearance.

The term "glossy" is applicable to the appearance of most hard cheeses. Even a hard cheese which may be characterized as dull has a definite gloss factor, as contrasted with an article which is flat.

In this application, percentages are by weight, dry basis unless otherwise specified.

The present invention also resides in a substrate coated with said confectionery product, the present invention being particularly applicable to coating farinaceous substrates such as crackers, croutons, bread sticks, and pretzels.

The present invention is also useful for application to irregular substrates such as corn chips.

In a preferred embodiment of the present invention, the emulsifier is a polyglycerol ester, a preferred such emulsifier being a blend of polyglycerol esters comprising octaglycerol monooleate, octaglycerol monostearate, and triglycerol monoshortening in relatively equal parts. This blend of polyglycerol esters is described in copending U.S. application Ser. No. 439,336, filed Nov. 5, 1982, assigned to assignee of the present application, now U.S. Pat. No. 4,464,411, issued Aug. 7, 1984.

Preferably, the lipid portion of the coating contains, in addition to hard butter, an amount of a hard fat or stearine having a Capillary Melting Point of 120° F. or higher, sufficient to obtain said heat stability. One specific such hard fat is a hydrogenated vegetable fat sold under the trademark "KLX", in flake form, by SCM Corporation. This flake has a Capillary Melting Point of 124°-130° F. A suitable blend contains about 2-12% stearine (based on total lipid content), a preferred ratio being 94% hard butter and 6% stearine.

DETAILED DESCRIPTION OF THE PRESENT INVENTION

The present invention, in essence, is based on the discovery that cheese powder, which normally is spray dried cheese, can be reconstituted with a hard butter to produce a product which has the same texture, appearance, flavor and mouth feel as natural cheese and at the same time is heat stable, as with natural cheese, and ambient stable, as contrasted with natural cheese. An aspect of the present invention is the discovery that improved coverture properties similar to that of a conventional confectionery coating can be obtained despite the high butterfat content imparted by the presence of a relatively large amount of cheese particles. Critical aspects of the present invention lie in the composition, proportions and method of preparation of the coating.

By heat stable, it is meant that the products of the present invention are resistant to physical change, resistant to fat bloom, and resistant to finger printing. Finger printing is that characteristic of products, e.g., coatings, by which the coatings are softened when finger touched by body heat sufficient to cause the coatings to become indented or show a finger imprint. In severe cases, the coatings are partially melted and adhere to the fingers. An example of physical change is melting of such coatings under transport conditions sufficient to cause coating runoff, or to cause the products to stick together. Fat bloom is phase separation and formation of islands of fat on the surface of the coatings.

To be ambient stable, the products of the present invention should have a moisture content less than about 3.5%, preferably less than about 2%. The spray dried cheese powders and cheese related filler usually have a maximum moisture content of about 4%, typically less than 3%. Dilution of these ingredients by other components of the formulation brings the product moisture content below the 3.5% level. Use of a matrix forming amount of hard butter resists moisture pickup and increase above this level and loss of ambient stability.

For purposes of the present application, a flavoring amount of cheese powders necessary to produce a flavor profile similar to that of natural cheese is broadly about 10-60% preferably about 25-45%, more preferably about 30-42%, based on the total weight of the product formulation. A high profile also is important in the case of coatings to reduce the amount of coating required, such coatings being relatively expensive compared to most substrates.

The cheese powders of the present invention normally have a gritty texture. The use of hard butter in sufficient amount to form a continuous matrix and completely enrobe the cheese particles also serves to mask this grittiness and obtain the smooth texture and appearance; of a hard cheese.

A matrix forming amount of hard butter is broadly in the range of about 20-60%, but preferably will be in the range of about 25-40%, based on the total weight of the coating formulation. The exact amount of hard butter used depends upon the properties desired in the final coating, and properties of the hard butter used. Generally, the higher the hard butter content, the lower the viscosity of the coating. A higher hard butter content also gives more hardness in the final product, and a smoother texture.

For application of the coatings to a porous substrate such as a cracker, it is desirable to have an appropriate controlled viscosity, at application temperature, to control the application weight and coverture by the coating. Optimally, the coatings of the present invention comprise about 6-33% by weight of the final product. On a cracker, an optimum range is about 10-33%. On a chip, such as a corn chip, an optimum range may be 6-15%.

To obtain the viscosity needed, particularly for application to a porous substrate, an important aspect of the present invention is employing a coating formulation which is lecithin free.

Higher viscosities, for instance about 90° MacMichael, increase coverture weight to perhaps as high as 33½% of total weight, while the low range, around 30° MacMichael, reduces coverture weight to as low as about 6-10%.*

*A MacMichael viscometer has been the standard instrument for measuring coating viscosity for many years.

The remainder of the product or coating of the present invention (about 10-35%, not including small amounts of emulsifier and flavorants such as salt and pepper) consists essentially of cheese-related powder fill compatible with the cheese particles. By compatible cheese-related fill, it is meant that such fill complements the flavor of the cheese particles, or is bland in flavor; and that the fill is capable of blending or being dispersed with the cheese particles and when so blended or dispersed provide resistance to heat instability. By way of example, suitable such fillers are non-fat dry milk, buttermilk solids, demineralized whey solids, lactose, fructose, sucrose, and blends thereof. Others will be apparent to those skilled in the art. The lactose, fructose, sucrose, and even the whey solids, add some sweetness to the formulation, which may or may not be desirable. It was found that the buttermilk solids, making up a portion of the coating formulation (for instance, a blend of 42% cheese powder and 18% buttermilk solids) provided with the cheese powders, the best cheese flavor.

The fill component or components should be comprised of inert particles capable of being non-gritty in the lipid phase, either rendered so by conventional confectionery refining techniques or by separate particle size reduction of the fill ingredients and adding the ground particulates to the lipid phase. For this purpose, a principal requirement of the fill is that it be friable, having a friability factor approximately equivalent to that of sugar.* Attrition of the fill particles can be carried out in a number of ways, for instance, in a hammer mill, a ball mill, or a roll mill. It also may be desirable, for optimum control of properties of the finished product, that the fill particles be substantially free of fat which would function as a diluent of the lipid phase. The fill particles, as mentioned, preferably are bland in taste, to avoid masking or adversely affecting the cheese flavor which is added. The particles are preferably nonhygroscopic, equivalent in this regard, as well, to sugar, to avoid water pickup prior to processing. Water can adversely affect processing during refining, and/or conching, causing undesired agglomeration, as is well known in confectionery practice. *

*By friability, it is meant that the fill ingredients are capable of a size reduction to not substantially greater than 50 microns average particle size.

Those particles which are bland in taste and at the same time have a high degree of friability and non-hygroscopicity approximating that of sugar, are disaccharides, such as the aforementioned lactose or whey. Whey is very high in lactose content. The whey can be demineralized whey or sweet dairy whey. Sweet dairy whey has a slight saltiness, which may be advantageous or disadvantageous, depending upon the cheese dominant flavor.

The fill particles of this invention can also include friable, dairy-derived food additives such as non-fat dry milk and non-fat buttermilk solids, both well known ingredients in confectionery formulations. Another useful fill ingredient is a protein, ore that is bland in flavor, such as defatted soy protein. A friable protein such as a caseinate can also be used. The protein provides nutrition and also a desired astringancy. A textured vegetable protein can be used. Another category of ingredients that can be used is a bland, hydrolyzed, non-hygroscopic friable starch, such as a low DE corn syrup solid, preferably having a dextrose equivalent less than about 15, e.g., maltodextrin.

Many other fill ingredients will be apparent to those skilled in the art, and many will be developed in the future since this is an area of rapidly developing technology. The present invention is not limited to specific fill ingredients. It is necessary only that they be bland or complementary in flavor with the cheese particles, that they be friable and non-hygroscopic. Preferably, they have a low fat content for reasons given. By being friable, they blend with the cheese particles and resist agglomeration of the same.

It is understood that the language "consists essentially of" is in reference only to the principal functional ingredients of the coating formulations of the present invention. The addition of non-functional ingredients as nut solids or flour chili powders, onion powders, green bell pepper powder, and spices such as cinnamon and almond paste, are within the scope of the present invention. Percentages are on a weight basis unless otherwise specified.

DESCRIPTION OF THE HARD BUTTER AND LIPID PHASE

In the practice of the present invention, the hard butter can be any of a large number of confectionery hard butters in the marketplace. Preferably, they have a Wiley Melting Point in the range of about 84°–120° F., as determined by AOCS method Cc2–38 and an approximate solid fat index, as determined by AOCS method Cd10–57, of

| Temperature °F. | Approx. Solid Fat Index |
|---|---|
| 80 | more than about 40 |
| 92 | More than 13, preferably more than 18 and less than about 35. |
| 100 | 11 max. |

A solids content at 92° F. of more than 13 is important to avoid finger printing.

A preferred hard butter, useful in the composition of the present invention, is Kaomel (trademark SCM Corporation), having a Wiley Melting Point in the range of about 97°–101° F. an IV of about 59, and a solid-fat index as follows:

| Temperature °F. | Approx. Sodid Fat Index |
|---|---|
| 50 | 69 min. |
| 70 | 59 min. |
| 80 | 52 min. |
| 100 | 5 max. |
| 110 | 0 |

This hard butter has an SFI at 92° F. of about 22 min. and is derived from a blend of hydrogenated soybean and cottonseed oil, as defined in U.S. Pat. No. 2,972,541 by Cochrane et al, assigned to assignee of the present application.

An advantage in the use of a non-lauric hard butter such as Kaomel is that it has a fairly steep Solids Fat Index slope at temperatures between 92° F. and 100° F., giving the product of the present invention a slightly chewy, slow-release sensation, characteristic of a hard cheese. To achieve this sensation, the hard butter preferably has a solids content at 92° F. of at least about 15 (but no more than 25), at 100° F. of less than 11, and 110° F., less than 2 (as determined by AOCS method Cd 10–57).

Another suitable hard butter useful in the coating composition of the present invention is Choco-mate (trademark SCM Corporation), having a Wiley Melting Point of about 102° F. and a solid fat index of

| Temperature °F. | Approx. Solid Fat Index |
|---|---|
| 50 | 78 |
| 92 | 33 |
| 100 | 1 |

An example of another hard butter is one of the Paramount series (trademark SCM Corporation) which have Wiley Melting Points ranging from about 101° F. to 114° F., an SFI at 50° F. of about 66–67, at 70° F. of about 53–56, and at 92° F. of about 13–26. A hard butter from hydrogenated vegetable oils, marketed by SCM Corporation under the trademark Duromel D, having a Wiley Melting Point of about 103°–107° F. and an SFI at 50° F. of 60 minimum and at 92° F. of 23 minimum can also be used.

A blend useful in the practice of the present invention is a blend of 75% Kaomel and 25% 100°–102° F. cottonseed oil. This blend has a Wiley Melting Point of about 99°–103° F. about 20% minimum SFI at 92° F., 51% minimum at 70° F., and 61 minimum at 50° F., and has been successfully employed with crystal modifying emulsifiers, specifically a combination of sorbitan monostearate (1.57%) and polysorbate 60 (1.05%). Such emulsifiers in combination with hard butters for obtaining gloss are known in the confectionery art. However, it was surprising that they also were effective in achieving a fracture and bloom-free surface and other properties in the instant cheese-containing coatings. Other crystal modifying emulsifiers may be employed in accordance with the concepts of the present invention, such as polyglycerol esters and propylene glycol monoesters.

To obtain resistance to finger printing, an effective amount of beta-forming stearine, for instance about 2–12% based on the hard butter content, is also included in the lipid phase, the stearine increasing the hardness and melting point of the coating formulation. This is in addition to the use of hard butter having an SFI at 92° F. of more than about 18. By way of example, one suitable stearine is a hydrogenated soybean stearine marketed by SCM Corporation under the trademark "KLX", said stearine having a Wiley Melting Point of at least about 120° F.

Other beta-forming stearines, for instance palm stearine, cottonseed stearine, and soya, known to those skilled in the art, can be employed.

Normally, an amount of stearine would have the disadvantage of providing a coating having some waxiness aftertaste. However, it was found, advantageously, in accordance with the concepts of the present invention, that the stearine helped produce a cheesier profile having more chewiness and a slower flavor release characteristic of natural cheese.

CHEESE POWDERS

There are many brands of cheese powders on the market that may be employed in the practice of the present invention. These may be employed alone or as blends, or in combination with cheese flavors (which are cheese powders with other ingredients). The cheese powders are simply dehydrated cheese, usually spray dried powders, and usually have a relatively high butterfat and/or vegetable fat content of, for instance, about 20 to about 46%. They are available in a number of different flavors, for instance, Swiss, Cheddar, aged or unaged, and, perhaps, colored or uncolored. Preferably the cheese powders are marketed with a moisture content of less than about 10%, preferably less than about 5%. The following Table 1 is a list of representative Swiss and Cheddar cheese powders and flavors successfully employed in the practice of the present invention:

TABLE 1
CHEESE POWDERS

| Trademark | Flavor | Min. Fat Content | Moisture Content Max. | Ingredient Declaration |
|---|---|---|---|---|
| Beatreme 1326 | Aged Cheddar | 46% | 3.5% | Cheddar cheese solids/sodium phosphate |
| Beatreme 1412 | Mild Cheddar | 46% | 3.5% | Manufactured from uncolored non-aged Cheddar cheese. |
| Cheztone 100 | Cheddar | 32% | 4.0% | Cheddar cheese solids, cultured non-fat milk solids, whey solids, hydrogenated shortening, salt, sodium phosphate; |
| Cheztone 101 | Cheddar | 32% | 4.0% | same as Cheztone 100 but with coloring. |
| Beatone 101 | Cheddar (high flavor powder) | 46% | 3.5% | Cheddar cheese solids |
| Beatreme 1923 | Typical Swiss | 39% | 3.5% | Swiss cheese solids/sodium phosphate |
| Beatone 700 | Swiss flavor | 20% | 4.0% | Enzyme modified swiss cheese solids, non-fat milk solids, sodium citrate. |
| Cheztone 700 | Swiss | 20% | 4.0% | Swiss cheese solids, cultured non-fat milk solids, sodium phosphate. |

The cheese powders and flavors of Table 1 are marketed by Beatrice Foods Co. In addition to the cheese powders of Table 1, the following have also been used:

TABLE 2

| | |
|---|---|
| Borden Co. #3653 | Cheddar cheese, hydrogenated vegetable oil, buttermilk solids, salt, sodium phosphate, sodium hexametaphosphate, citric acid, lactic acid, and artificial color. |
| Nutritek 250 (Foremost Foods) Borden Zest 13653 | Whole milk cheese whey with 25% of the mineral salts removed. |
| Borden Co. #90 | Cheddar cheese, hydrogenated vegetable oil, condensed buttermilk, sodium chloride, disodium phosphate, sodium hexametaphosphate, citric acid, lactic acid, artificial color. |
| Borden Co. #87 | Swiss cheese flavoring powder alternative to Cheztone 700. |
| Land-O-Lakes Dried Process Cheese #5540 | Spray dried process cheese produced by removing moisture from processed American cheese by spray drying; fat content 46.5%, moisture 4%. |
| Land-O-Lakes #9809 | Spray dried Blue cheese produced by removing the moisture from aged Blue cheese; fat content 41%, moisture 4%. |
| Land-O-Lakes Cheddease 250 | Cheddar cheese in powder form - contains also buttermilk, whey, butter, salt, sodium phosphate, flavoring, MSG, coloring; fat content 25%, moisture 4%. |

The following blends of cheese powders were used to give different flavors. The proportions given in Table 3 are based on the total composition weight of the coatings in which the cheese powders were incorporated.

TABLE 3
CHEESE POWDER BLEND

| | | |
|---|---|---|
| low strength Swiss cheese flavor | 23% 6% | Beatreme 1923A Borden #81 |
| medium strength Swiss cheese flavor | 24.5% 8% | Beatreme 1923A Borden #87 |
| high strength Swiss cheese flavor | 27% 10% | Beatreme 1923A Borden #87 |
| medium strength Cheddar cheese flavor | 22% 2.5% 8% | Beatreme 1326 Cheztone 101 Borden #90 |
| high strength Cheddar cheese flavor | 24% 5% | Beatreme 1326 Cheztone 101 |
| medium strength American cheese flavor | 8% 32.5% | Borden #90 Beatreme 1412 |

OTHER INGREDIENTS

In addition to the above ingredients, the coating or product formulations of the present invention include minor amounts of such flavorants as salt and pepper, and also, desirably, an amount of an emulsifier. A particularly preferred emulsifier, as mentioned above, is a unique blend of polyglycerol esters comprising approximately equal amounts of octaglycerol monooleate, octaglycerol monostearate, and triglycerol monoshortening. This blend is described in co-pending application Ser. No. 439,336 filed Nov. 5, 1982, assigned to assignee of the present application, now U.S. Pat. No. 4,464,411. As indicated in said co-pending application, the blend provides improved crystal formation, so that the product is free from surface fractures or bloom, and organoleptic characteristics are not only not adversely affected, but are even improved. Other emulsifiers and emulsifier blends can be employed, such as sorbitan monostearate, polysorbate 60, and propylene glycol monostearate. The amount of emulsifier used can be varied and is an effective amount to accomplish the above objectives. About 5 to about 7% of the above mentioned blend of polyglycerol esters (based on formulation weight) was found to be particularly effective.

SUBSTRATES

Many different substrates have been coated or enrobed in accordance with the concepts of the present invention, for instance corn chips, smoked braunschweiger, peanut butter food sticks, saltines, Escort crackers, Ry-Crisp crackers, bread sticks, pretzels and croutons. In all instances, the cheese coatings complemented the substrates and provided an article with a good appearance, good flavor balance, a highly desirable cheesy texture and good storage stability, either refrigerated or unrefrigerated, depending upon the substrate. In this latter regard, for meat substrates, refrigeration storage may be necessary.

The amount of coverture on the substrates was dependent on a number of factors; the flavor intensity desired, porosity of the substrate, flow characteristics of the coating, shape of the substrate, and other factors.

Preferably, as previously indicated, the coverture ranges from about 6 to 33%, depending upon the above factors. The coatings are expensive, so that the least amount of covering possible, while still providing the flavor balance or intensity and texture desired, is preferred. On a cracker, an optimum range, again, may be about 10–33%. On a corn chip, an optimum range may be about 6–15%.

PREPARATION OF THE COATINGS

In the practice of the present invention, the lipids are first pre-melted to a liquid and then added to a dry mix of the other ingredients, the mixing of the lipids and other ingredients being carried out until a very thick homogeneous paste is obtained. The mixture is then reduced in particle size (refined) to eliminate graininess, by roller mills (which can be 3 or 5 rolls), or ball mills and others; and then, employing conventional confectionery techniques, is conched at an elevated temperature; for instance about 130° F., in a mixer, for a period of time from about one hour up to about 12 hours, if desired. Following conching, the coatings may be placed in molds and cooled to about 55° F. until ready for use, or can be at that point applied to a substrate. Application is carried out at an elevated temperature, for instance about 105° F. to about 120° F., depending upon the type of applicator employed. For instance, with a spray applicator, the higher temperature of about 120° F. may be desirable. Following application, the coated products are passed through a cooling tunnel, again using conventional confectionery techniques, and cooled to about 50°–65° F. in a short period of time, about 5 minutes.

Application of the coatings to a substrate can be carried out by a number of different procedures or use of different applicators other than a spray device, for instance by brush, dipping, or the like.

In the above, an advantage of the present invention is the ability to use conventional confectionery processing equipment.

By the confectionery procedures employed, coatings which have a somewhat gloss surface similar to that of natural cheese are obtained. The coatings are resistant to moisture pickup, and thus are ambient stable. When applied to a substrate, they are in a convenient form for consumption and offer nutritional value.

EXAMPLE 1

A coating formulation embodying the concept of the present invention was successfully applied to the following substrates:

Nabisco

Triscuit Wafers
Wheatsworth Wheat Cracker
Waverly Wafers

New London

Salty Rye Melba Toast

Keebler

Rye Rounds

Planters

Peanuts, dry roasted
Cheez Balls

The coating, which contained the following ingredients, was applied to only one side by brushing it in place.

| CHEDDAR CHEESE COATING | |
|---|---|
| Ingredient | Percentage by weight |
| Hardbutter (Kaomel) | 36.33 |
| Beatone 101 (Beatrice) | 2.45 |
| Beatreme 1326 (Beatrice) | 21.54 |
| Borden's Cheese Zest 13653 | 7.82 |
| Nonfat Dry Milk | 9.79 |
| Buttermilk Solids | 9.79 |
| Lactose | 9.79 |
| Polyglycerol Ester 8-1-S flakes | 1.02 |
| Polyglycerol Ester 3-1-S | 0.73 |
| Polyglycerol Ester 8-1-O* | 0.73 |
| | 100.00% |

*marketed by SCM Corporation under the trademark "Santone". These are basically equal parts. 8-1-S has some stearine in it.

The coating was prepared by first melting the polyglycerol esters into the hardbutter at about 150° F. and then refining the coating in a refiner using conventional confectionery techniques and procedures. The coating was then conched at 125° F. for 1–2 hours and enrobing of the substrates took place at about 105° F.

Texture-wise, it was slightly chewy, similar to a natural hard cheddar cheese and also homogeneous and smooth in consistency. It had a gloss similar to a natural cheese, exhibited no tendency to bloom, and gave with the substrates an excellent flavor profile. The coating had a moisture content of less than about 3.5%.

The coating had good ambient and heat stability and was capable of application at a coverture of about 10–33%.

EXAMPLE 2

The following cheddar cheese formulation was applied to a corn chip:

| Ingredient | Approx. % by weight |
|---|---|
| Kaomel hard butter | 29.2 |
| KLX stearine | 1.8 |
| Beatreme 1412 | 32.5 |
| Cheddar cheese, Chez-Tone 100 | 10.8 |
| Buttermilk solids | 9.3 |
| Non-fat milk solids | 7.7 |
| Salt | 6.6 |
| 8-1-S | .9 |
| 8-1-O | .6 |
| 3-1-S | .6 |
| | 100.00% |

The coating was refined at 80 psi, first stage, and 150 psi, second stage, and conched at 140° F. for a minimum of 30 minutes. As with Example 1, the coating exhibited natural cheese gloss and was bloom free. It was hard, as in a conventional confectionery coating, resistant to finger printing, a chewy cheese texture, and the flavor of a hard cheese. The coating exhibited an excellent flavor profile on the corn chips when applied at a coverture of about 8%. Its moisture content was less than about 3.5%. The presence of the stearine gave improved resistance to finger printing. In addition to heat stability, the coating had good ambient stability.

In addition to the above listed ingredients, similar coatings were prepared containing minor amounts of flavoring ingredients such as green bell pepper powder, chili powder, onion powder, bacon flavor, and colorants to enhance or complement the basic cheese flavor and coating appearance.

EXAMPLE 3

The coating of Example 1, at application temperature, had good viscosity for application to a substrate. Appearance-wise, the coating stood up on the surface of the substrate without runoff. This example illustrates the affect of composition on viscosity.

The following cheese formula was employed:

| CHEESE FORMULA | |
|---|---|
| Fat/emulsifier phase | 36% approx. |
| Flavor phase | 64% approx. |
| Flavor Phase | |
| Beatone 101 | 4.00 |
| Beatreme 1326 | 35.20 |
| Borden 13653 | 12.80 |
| Nonfat dry milk | 16.00 |
| Buttermilk solids | 16.00 |
| Lactose | 16.00 |
| | 100.00% |

Five different samples were prepared with different fat/emulsifier phases, as shown in the following Table:

TABLE 4

| Viscosity | Sample 1 Kaomel[1] No polyglycerol Ester | Sample 2 Kaomel[2] with Polyglycerol Ester | Sample 3 Hard butter[3] with lecithin | Sample 4 Hard butter[4] w/o lecithin | Sample 5 Hard butter[5] without lecithin + 2.75 times emulsifier of Sample 4 |
|---|---|---|---|---|---|
| Casson[6] Yield Value (dyne/cm$^2$) | 34 | 68 | 11 | 32 | 68 |
| Casson[6] Plastic Value (poise) | 2.0 | 2.4 | 3.2 | 2.7 | 2.4 |
| MacMichael Viscosity (°) | 23° | 39° | 14° | 24° | 38° |
| Hardness 70° F. (mm penetration) | 3.1 | 3.1 | — | — | 4.3 |
| Gloss Enrobed (cooling tunnel) | — | Flat | — | — | — |
| Cycling Enrobed (1 week) | — | High | — | — | — |
| Observations | Speckled | OK | OK | OK | OK |

[1] Kaomel as hard butter phase.
[2] Kaomel (91.2%), 3-1-S (2.0%), S-1-O (2.0%), 8-1-S Flakes (2.8%).
[3] A non-lauric hard butter (Duromel D) marketed by SCM as a confectionery coating, having a Drop Point 1° C./min. at about 39–41° C., an SFI at 50° F. of 60 minimum, at 70° F. of 52 minimum, and a 92° F. of 23 minimum. The hard butter contained Durtan 60 (1.57%), Durfax 60 (1.05%) + 0.4% lecithin basis fat formula weight. Durtan 60 (trademark SCM Corporation) is sorbitan monostearate. Durfax 60 (trademark SCM Corporation) is polysorbate 60.
[4] Duromel D without lecithin − Durtan 60 (1.57%), Durfax 60 (1.05%).
[5] Duromel D without lecithin + 2.75 times emulsifiers − Durtan 60 (4.32%), Durfax 60 (2.89%).
[6] These Casson values ae obtained on a Brookfield Model HAT Viscometer equipped with a Model SC4-27/13 small sample adapter. The procedure is described in "33rd PMCA Production Conference", 1979, pp 48–53.

TABLE 4

In Table 4, the formulation of Kaomel with a blend of polyglycerol esters (Sample 2) is in accordance with the concepts of the present invention. Sample 3 is an example of one prepared according to the teachings of co-pending application Ser. No. 592,176.

Table 4 permits the following conclusions;

1. Kaomel hard butter with polyglycerol ester (Sample 2) produced the highest viscosities at coating application temperature for known legal formulas tested. Sample 5, with 2.75 times normal amounts of polysorbate and sorbitan monostearate, may not be legal under FDA rules.
2. Kaomel hard butter with polyglycerol ester (Sample 2) produced a better viscosity for coating application than the Duromel D hard butter with lecithin formula (Sample 3). The hard butters of Samples 2 and 3 are both useful for confectionery coatings.
3. Formulas with polyglycerol or 2.75 times normal amounts of polysorbate and sorbitan monostearate were harder than formulas without such emulsifiers.
4. Cheese coatings are generally softer and of lower viscosity, because of added butterfat and/or vegetable fat (from the cheese powder), than equivalent cocoa powder coatings.
5. Speckling was noticed in non-emulsified Kaomel cheese coatings.

What is claimed is:

1. A cheese flavored confectionery product capable of being applied to a substrate and having the appearance, flavor, and texture of a hard cheese, comprising, based on total composition weight;
   (a) about 10–60% powdered dry cheese;
   (b) about 10–35% particulate fill having a flavor which is bland or compatible in flavor with the flavor of cheese powder;
   (c) about 20–60% hard butter having a Wiley Melting Point in the range of about 84° to 120° F., said hard butter having an SFI at 92° F. of at least about 13;
   (d) an amount of a gloss-forming emulsifier effective to resist surface fracture and bloom;
   (e) about 2–12% stearine based on hard butter weight;
   said composition being processed by milling or refining and conching and having a MacMichael viscosity of at least about 30° at the temperature of application of the composition to a substrate.
2. The cheese flavored confectionery product of claim 1 which is lecithin-free.
3. The cheese flavored confectionery product of claim 1 wherein siad product is heat stable and applied to the substrate from a molten condition.
4. The cheese flavored confectionery product of claim 1 wherein said powdered dry cheese is present in an amount of from about 25 to about 45% by weight, said particulate fill is present in an amount of from about 10% to about 35% byt weight, and said hard butter is present in an amount of from about 25 to about 40% by weight.
5. The cheese flavored confectionery product of claim 1 wherein said emulsifier is present in an amount of about 5–7% and is a polyglycerol ester or blend of polyglycerol esters.

6. The cheese flavored confectionery product of claim 1 wherein said powdered dry cheese and said hard butter are simultaneously processed in a three-roll refiner.

7. The cheese flavored confectionery product of claim 6 wherein said hard butter has an approximate solids content at 92° F. of at least about 15, at 100° F. of less than about 10, and at 110° F. less than about 2.

8. The product of claim 1 wherein said cheese powder has a butterfat and/or vegetable fat content by weight of at least about 20%.

9. The product of claim 5 wherein said polyglycerol ester is a blend of approximately equal amounts of octaglycerol monooleate, octaglycerol monostearate and triglycerol monostearate.

10. A method of preparing a cheese flavored confectionery product capable of being applied to a substrate and having the appearance, flavor and texture of a hard cheese comprising
   (a) blending about 10–60% powdered dry cheese powder with about 10–35% particulate fill which is bland or compatible in flavor with the flavor of the cheese powder, said percentages being based on total composition weight;
   (b) preparing a molten lipid blend which includes based on total composition weight about 20–60% hard butter having a Wiley Melting Point in the range of about 84° and 120° F., about 2–12% stearine based on hard butter weight, and a gloss-forming emulsifier effective to resist surface fracture and bloom, said hard butter having an SFI at 92° F. of at least about 13;
   (c) processing said composition by the steps of milling or refining and conching, said composition having a MacMichael viscosity of at least about 30° at the temperature of application of the composition to a substrate; and
   (d) allowing said processed combination to cool.

11. The method of claim 10 wherein said powdered dry cheese fill and said lipid blend are simultaneously processed in a three-roll refiner.

12. A coated food product comprising an edible substrate and the coating of any of claims 1, 2, 4, 5 or 6.

13. The product of claim 12 wherein said substrate is a farinaceous material.

* * * * *

UNITED STATES PATENT AND TRADEMARK OFFICE
CERTIFICATE OF CORRECTION

PATENT NO. : 4,567,047
DATED : January 28, 1986
INVENTOR(S) : Lonny L. Wilson

It is certified that error appears in the above-identified patent and that said Letters Patent is hereby corrected as shown below:

On the title page item [19], "SCM Corporation" should read -- Wilson --.

item [76],"SCM Corporation, 02, New York, N. Y." should read -- [76] Inventor: Lonny L. Wilson, Brunswick, Ohio --.

On the title page insert:

-- [73] Assignee: SCM Corporation, New York, N. Y. --.

Signed and Sealed this

Thirteenth Day of May 1986

[SEAL]

Attest:

DONALD J. QUIGG

Attesting Officer

Commissioner of Patents and Trademarks